(12) United States Patent
Koyama et al.

(10) Patent No.: US 8,584,595 B2
(45) Date of Patent: Nov. 19, 2013

(54) VEHICLE DRIVE APPARATUS

(75) Inventors: Taihei Koyama, Tachikawa (JP);
Shinichi Noda, Kawasaki (JP);
Shigetomo Shiraishi, Fuchu (JP);
Kazuaki Yuuki, Tokorozawa (JP);
Daisuke Misu, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 166 days.

(21) Appl. No.: 12/914,124

(22) Filed: Oct. 28, 2010

(65) Prior Publication Data
US 2011/0100253 A1 May 5, 2011

(30) Foreign Application Priority Data

Oct. 30, 2009 (JP) .................................. 2009-251179

(51) Int. Cl.
*B61C 1/00* (2006.01)
*B61C 11/00* (2006.01)
(52) U.S. Cl.
USPC ........................................ 105/133; 105/34.1
(58) Field of Classification Search
USPC ............... 105/26.05, 34.1, 96, 133, 136, 137, 105/157.1, 182.1
See application file for complete search history.

(56) References Cited

U.S. PATENT DOCUMENTS

| | | | |
|---|---|---|---|
| 5,982,071 A * | 11/1999 | Ehrick | 310/216.056 |
| 7,434,608 B2 * | 10/2008 | Shindo et al. | 165/42 |
| 2008/0011185 A1 | 1/2008 | Yuuki et al. | |
| 2008/0179999 A1 | 7/2008 | Nakazawa et al. | |

FOREIGN PATENT DOCUMENTS

| | | |
|---|---|---|
| JP | 58-95360 | 6/1983 |
| JP | 2007-37262 | 2/2007 |
| JP | 2007-336779 | 12/2007 |
| JP | 2008-125221 | 5/2008 |
| JP | 2008-160986 | 7/2008 |
| JP | 2008-179285 | 8/2008 |
| JP | 2009-124829 | 6/2009 |
| WO | WO 2009/063774 A1 | 5/2009 |

OTHER PUBLICATIONS

Japanese Office Action mailed Jul. 2, 2013 in corresponding application No. 2009-251179. (with English translation).

* cited by examiner

*Primary Examiner* — R. J. McCarry, Jr.
(74) *Attorney, Agent, or Firm* — Oblon, Spivak, McClelland, Maier & Neustadt, L.L.P.

(57) ABSTRACT

According to one embodiment, a vehicle drive apparatus configured to drive a vehicle includes a motor arranged on a bogie to drive a wheel, a cooling fan arranged to be rotatable integrally with a rotational shaft of the motor to cool the motor, a control device arranged under a floor of the body to face the bogie and configured to supply an electric power to the motor and control the motor, and a ventilation duct arranged between the motor and the control device and configured to guide a cooling wind blown by the cooling fan into the control device.

5 Claims, 13 Drawing Sheets

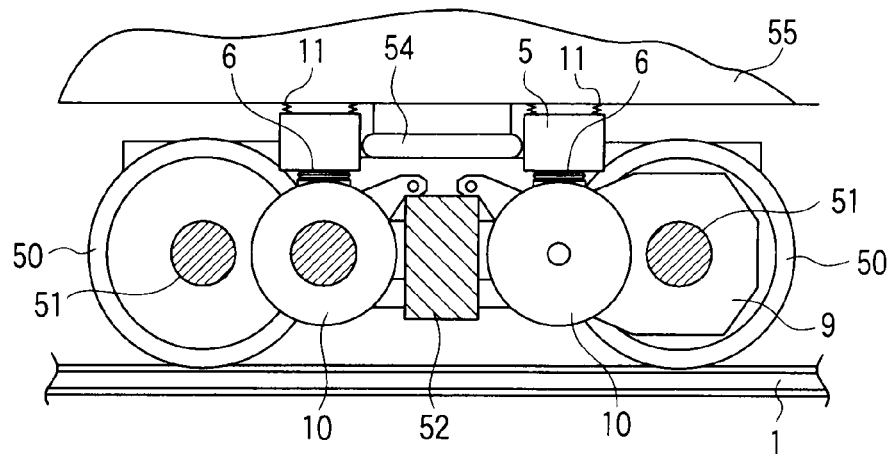
F I G. 12
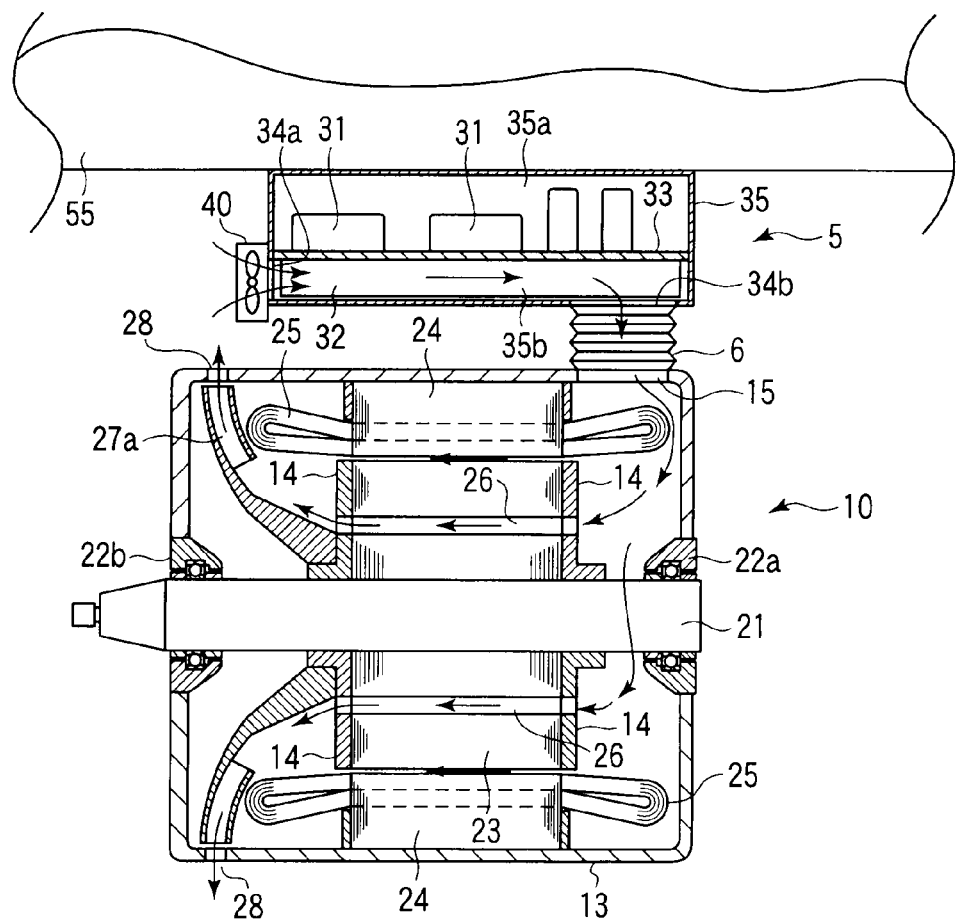
F I G. 13

VEHICLE DRIVE APPARATUS

CROSS-REFERENCE TO RELATED APPLICATIONS

This application is based upon and claims the benefit of priority from Japanese Patent Application No. 2009-251179, filed Oct. 30, 2009; the entire contents of which are incorporated herein by reference.

FIELD

Embodiments described herein relate generally to a vehicle drive apparatus including a motor and a control device for controlling the motor.

BACKGROUND

For example, a vehicle drive apparatus for a railway vehicle, a railway rolling stock, and the like includes a plurality of main electric motors respectively arranged on a bogie in proximity to wheels and control devices for driving these main motors. The main motor is connected to the wheels via gears, and the main motor rotates the wheels, whereby the entire rolling stock runs. The main electric motor receives electric power via wires from the control device arranged under a floor of the rolling stock, and the operation of the main motor is controlled by the control device. Therefore, a set of a main motor and a control device is deemed as one drive apparatus. When the main motor and the control device are integrally arranged or arranged in proximity to each other, it is not necessary to route long wires, in which case an ideal drive apparatus can be achieved.

Recently, the control device is mainly arranged in a different position away from the main motor, such as a position under a floor of a central portion of the rolling stock. One of the reasons therefor is a volume occupied for cooling. The control device generates heat due to switching of devices when the rolling stock accelerates and decelerates. Recently, it is common to use a method for cooling the control device by using the natural wind generating by the traveling of the rolling stock. The amount of the wind due to the traveling of the rolling stock increases as the velocity of the rolling stock increases, but in general, the wind is as low as about 2 to 4 m/s. Therefore, the control device is provided with many radiating fins in order to increase the area of heat radiation, and also uses heat pipes in order to expedite the heat radiation. The volume of the portion needed for cooling occupies 60% or more of the entire control device. Therefore, the control device for the railway vehicle is different from control devices for automobiles and generators and is large in volume. Thus, it is difficult to integrally form the control device with the main motor within the bogie, whose size is strictly limited.

In order to reduce the size of the control device, it is conceivable to reduce the volume of the radiating fins occupying more than half of the volume of the control device. For example, the volume needed for heat radiation may be reduced by using a forced air cooling. However, when a cooling fan for the forced air cooling is attached, a stop of the cooling fan due to malfunction and the like may result in insufficient cooling effect. As a result, the device will break down, and the vehicles will stop. Therefore, the cooling device requiring electric power increases the risk of the malfunction.

Accordingly, it is conceivable to forcibly cool the control device by blowing cooling wind into a cooling device by using the rotation of the main motor. An example of the drive apparatus using the above method and integrally formed with the main motor and the main control device is an apparatus disclosed in Jpn. Pat. Appln. KOKAI Publication No. 2007-37262. In this apparatus, a fan arranged on a rotor of a main motor rotates according to rotation of the main motor, and the fan draws fresh air. The drawn fresh air passes through the control device. At this occasion, the air removes heat from the control device, and the air is discharged to the outside. Since the fans reliably rotate whenever the main motor rotates, a malfunction of the cooling fan alone will never occur.

However, the above-explained conventional vehicle drive apparatus has the following problem to be solved. That is, in the drive apparatus for the railway vehicle, the main motors are arranged on the bogie, which produces extremely strong vibration. When the control device is integrally formed with the main motor, the control device directly receives the vibration from the bogie and the main motor. Although the motors do not break down because the motors are designed to withstand the vibration of the bogie, the currently available control device may break down since it is not sufficiently designed to be vibration-proof.

BRIEF DESCRIPTION OF THE DRAWINGS

FIG. 12 is a sectional view, corresponding to FIG. 2, illustrating a vehicle drive apparatus according to an eighth embodiment;

FIG. 13 is a longitudinal sectional view illustrating a vehicle drive apparatus according to a ninth embodiment;

DETAILED DESCRIPTION

In general, according to one embodiment, a vehicle drive apparatus is configured to drive a vehicle comprising a bogie with a wheel and a body supported on the bogie via a vibration damping mechanism. The vehicle drive apparatus comprises: a motor arranged on the bogie to drive the wheel; a cooling fan arranged to be rotatable integrally with a rotational shaft of the motor to cool the motor; a control device arranged under a floor of the body to face the bogie and configured to supply an electric power to the motor and control the motor; and a ventilation duct arranged between the motor and the control device and configured to guide a cooling wind blown by the cooling fan into the control device.

Figure 17:
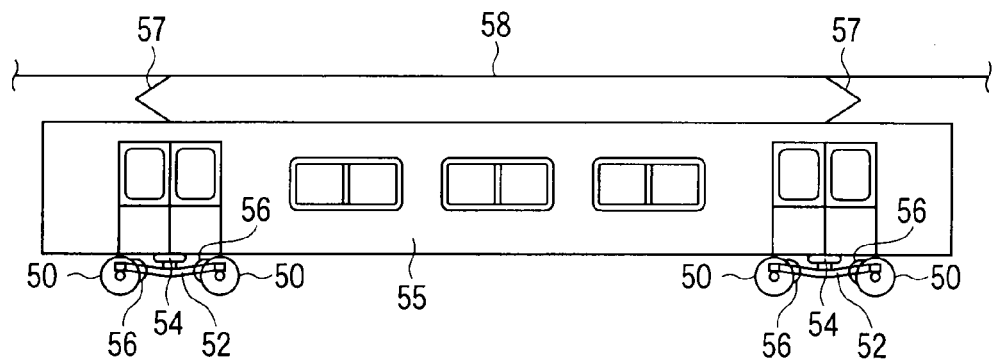
FIG. 17 is a side view illustrating a railway vehicle including a vehicle drive apparatus.

First, a railway vehicle or rolling stock including a vehicle drive apparatus according to an embodiment will be explained. FIG. 17 schematically illustrates a railway vehicle. This railway vehicle comprises a pair of bogies 52 each arranged with wheels 50, and a body 55 supported on the bogies 52 via air springs 54 serving as a vibration damping mechanism. The wheels 50 are placed on rails, not shown. A structure including the wheels 50, the bogie 52, and the air spring 54 is collectively referred to as a bogie. A vehicle drive apparatus 56 is placed in proximity to each bogie 52. As explained later, the vehicle drive apparatus 56 comprises an electric motor and a control device for controlling the motor and applying electric power to the motor. The motor is arranged on the bogie 52, and is connected such that the rotating force can be transmitted to the wheels 50 via a coupling.

Pantographs 57 are arranged on a roof of a body 55 which can carry passengers and goods. These pantographs 57 are in contact with an overhead wiring 58. The electric power supplied from the overhead wiring 58 to the pantographs 57 passes through other devices, not shown, and is supplied to the control devices. The electric power is converted by the control devices from direct current into alternating current, and the converted electric power is supplied to each motor via wires, not shown. The motors operate on the received electric power, and rotate the wheels 50 via gear boxes and couplings. Thus, the body 55 runs on the rail.

Subsequently, the vehicle drive apparatus according to the embodiment will be explained.

First Embodiment

Figure 1:
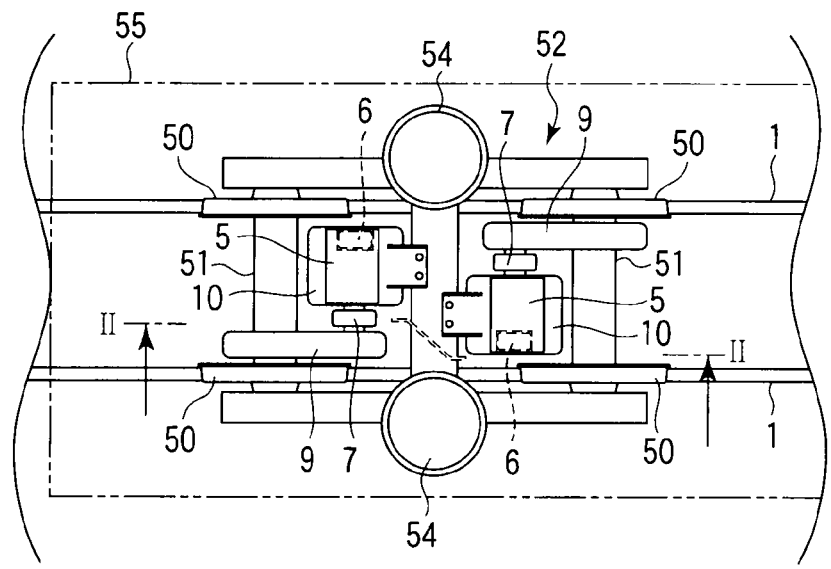
FIG. 1 is a partially cutaway top view illustrating a vehicle drive apparatus according to a first embodiment.
Figure 2:
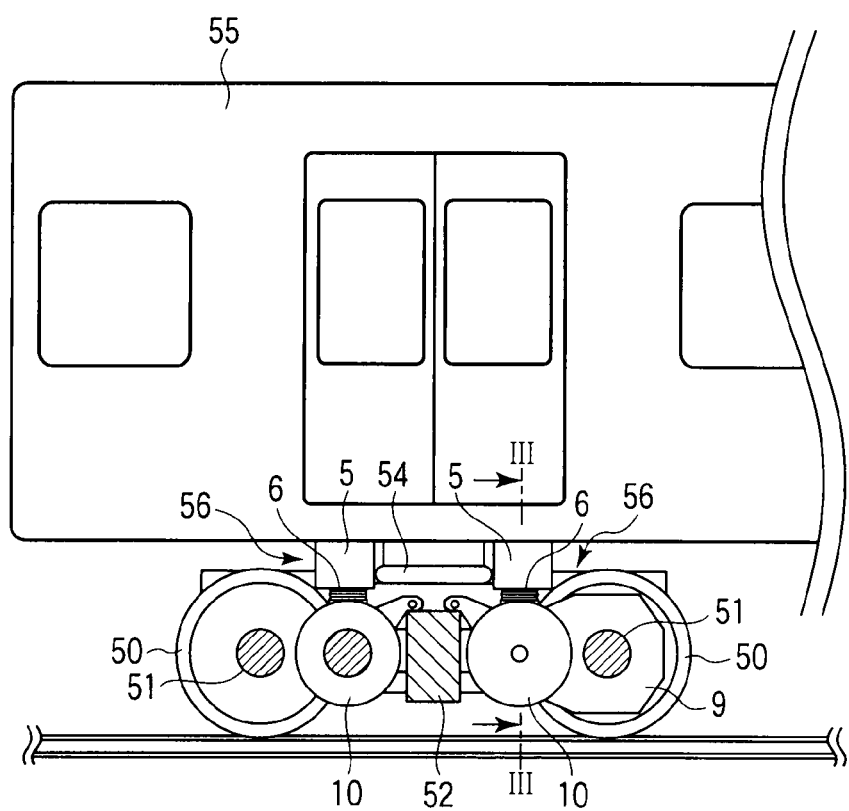
FIG. 2 is a sectional view illustrating the vehicle drive apparatus taken along a line II-II of FIG. 1.
Figure 3:
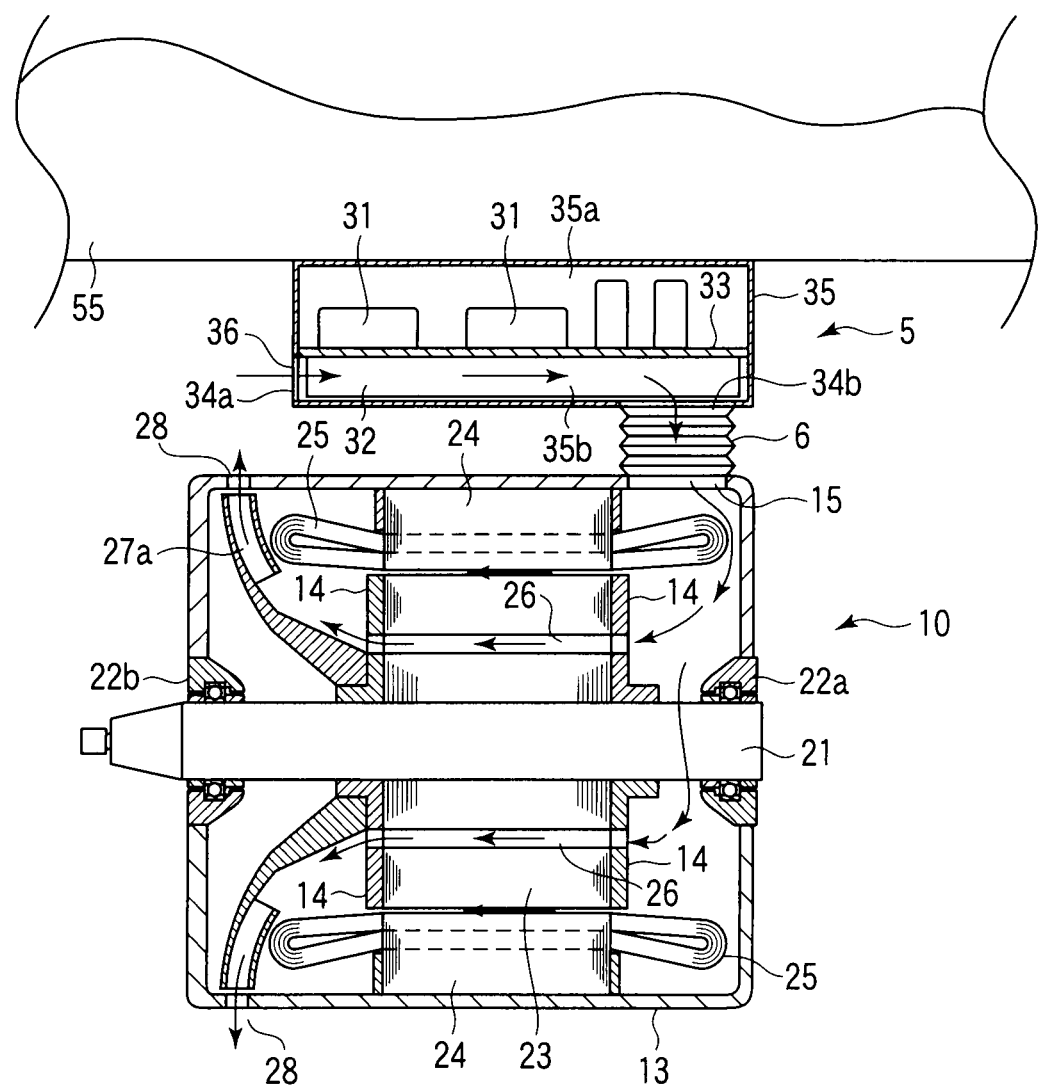
FIG. 3 is a sectional view illustrating the vehicle drive apparatus taken along a line III-III of FIG. 2.

FIG. 1 is a top view illustrating a bogie portion of a vehicle drive apparatus according to a first embodiment. FIG. 2 is a sectional view illustrating the vehicle drive apparatus taken along a line II-II of FIG. 1. FIG. 3 is a top view illustrating the vehicle drive apparatus when the bogie of FIG. 1 runs on a curved section.

As shown in FIGS. 1 and 2, two rails 1 having a substantially I-shaped cross section are arranged on a ground, not shown, with a certain interval therebetween in such a manner that the two rails 1 are substantially in parallel. The bogie 52 includes a frame formed in a substantially H-shape, and four wheels 50 are rotatably attached to both end portions of this frame. Two wheels 50 are respectively attached to both end portions of an axle 51 having a cylindrical shape. Both ends of this axle 51 are rotatably supported by the bogie 50. There are two pairs of wheels 50 and axles 51, which are supported by the bogie 52. The four wheels 50 are placed on the rails 1, and are configured to roll on the rails 1.

Two air springs 54 are arranged at an upper portion of a connection portion of a beam of the bogie 52 so as to elastically support the body 55. Two motors 10 are arranged in proximity to a central portion of the bogie 52. The rotational shaft of each of the motors 10 is connected to a gear box 9 via a coupling 7. The gear box 9 is rotatably connected to the axle 51. When each motor 10 operates, the axle 51 rotates via the gear box 9, whereby the wheels 50 can run on the rails 1.

A control device 5 for controlling each motor 10 is arranged on a surface below the floor of the body 55 but above the bogie 52. Herein, the control device 5 is arranged immediately above each motor 10. An upper portion of the motor 10 and the control device 5 are connected via a bellows-shaped ventilation duct 6 having retractility and flexibility. The distance between the motor 10 and the control device 5 in the vertical direction is set larger than a thickness of the air spring 54. Two sets of the motors 10, the gear boxes 9, and the like are arranged symmetrically with respect to a central point of the bogie 52 from the perspective of the top view showing the bogie 52.

The position at which the control device 5 is provided is not limited to the position immediately above the motor 10. The position of the control device 5 may be freely selected, for example, from a position above the axle 51 and a position away from the motor such as the upper portion of the connection portion between the motor 10 and the bogie 52. However, since the motor 10 and the control device 5 are connected by the ventilation duct 6, the motor 10 and the control device 5 are arranged as closely to each other as possible. Further, the ventilation duct 6 is not limited to the bellows shape, and may have other shapes as long as the ventilation duct 6 is made of a flexible material or is configured to be extendable.

FIG. 3 is a sectional view illustrating the vehicle drive apparatus 56 taken along a line III-III of FIG. 2. As shown in FIG. 3, the electric motor 10 includes a cylindrical motor frame 13 both ends of which are substantially closed and a rotational shaft 21 arranged to penetrate through this motor frame 13 in a substantially coaxial manner. Both ends of the rotational shaft 21 are rotatably supported by bearings 22a, 22b on the motor frame 13, and protrude outward from the motor frame 13. One of the end portions of the rotational shaft 21 constitutes an output end for outputting driving force to the wheels 50 via the coupling 7, the gear box 9, and the like as shown in FIG. 1.

In the motor frame 13, a cylindrical rotor core 23 formed with a laminated core is fixed to a central portion of the rotational shaft 21 in an axial direction. The rotor core 23 is sandwiched by a pair of rotor core holders 14 from both side surfaces of the axial direction. A plurality of rotor ducts 26 penetrating both of the rotor core 23 and the rotor core holders 14 in the axial direction are formed in the rotor core 23 and the rotor core holders 14.

On an outer peripheral side of the rotor core 23, a cylindrical stator core 24 formed with a laminated core is arranged with an air gap. The stator core 24 is fixed to an inner periphery of the motor frame 13. An inner peripheral portion of the stator core 24 is formed with a plurality of grooves extending in the axial direction, and a stator coil 25 is buried in these grooves. Coil ends of the stator coil 25 protrude in the radial direction from both side surfaces of the stator core 24.

In the motor 10, an inner fan 27a serving as a cooling fan is attached to a load side of the rotational shaft 21, and the inner fan 27a rotates integrally with the rotational shaft 21. This internal fan 27a is generally called a radical fan, which is formed to work in both of the rotating directions of the rotational shaft 21. In the present embodiment, the internal fan 27a is connected to an end portion of the rotor core 23. However, the internal fan 27a may be attached to any position as long as the internal fan 27a rotates integrally with the rotational shaft 21. The motor frame 13 is formed with exhaust openings 28 facing an external periphery of the internal fan 27a. The exhaust openings 28 are formed at a plurality of positions of the periphery. A ventilation hole 15 is formed at an upper portion of the motor frame 13 at the side opposite to the load side of the motor 10. In general, the motor having this kind of structure is called a self-ventilated type.

One end of the ventilation duct 6 is connected to the motor frame 13, and is in communication with the inside of the motor via the ventilation hole 15. The other end of the ventilation duct 6 is connected to the control device 5 arranged at the portion under the floor of the body 55 but above the motor 10. In the present embodiment, the ventilation duct 6 is arranged at the upper portion of the motor 10. However, the arrangement is not limited thereto. The position to which the ventilation duct 6 is attached can be selected freely according to an available space. Examples of positions to which the ventilation duct 6 is attached include side surfaces and a peripheral direction of the side opposite to the load of the motor 10.

The control device 5 includes a planar attachment base 33. A plurality of switching devices 31 and other devices are arranged on the upper surface of the attachment base. On the lower surface of the attachment base 33, many radiating fins 32 are arranged vertically with a gap between each other. The control device 5 includes the attachment base 33, the switching devices 31, and a rectangular box-shaped casing 35 housing the radiating fins 32. The casing 35 is separated by the attachment base 33 into a first chamber 35a housing the switching devices 31 and a second chamber 35b arranged with the radiating fins 32.

The casing 35 includes a first ventilation hole 34a arranged at one end side in a longitudinal direction of the radiating fins 32 and in communication with the second chamber 35b, and a second ventilation hole 34b arranged at the other end side in the longitudinal direction of the radiating fins 32 and in communication with the second chamber 35b. The first ventilation hole 34a may be arranged with an intake filter 36 for collecting dusts and the like.

The control device 5 is attached to the surface below the floor of the body 55 in such a manner that the attachment base 33 extends in a substantially horizontal manner and the radiating fins 32 are in a direction in which the vehicle runs. The switching device 31 and the other devices are located on the side of the body 55 with respect to the attachment base 33, and the radiating fins 32 are located on the side of the motor 10 with respect to the attachment base 33. The upper end of the ventilation duct 6 is connected to the casing 35 of the control device 5, and is in communication with the second chamber 35b via the second ventilation hole 34b.

The attachment base 33 is arranged in the horizontal direction. However, in a case where a space is available, the attachment base 33 may be arranged in the vertical direction. Even in such case, the switching device 31 and the other devices are arranged on one side of the attachment base 33, and the radiating fins 32 are arranged on the other side of the attachment base 33.

Subsequently, operation of the vehicle drive apparatus having the above structure will be described.

When the vehicle runs, electric power is supplied to the motors 10 from the control device 5 via a wire, not shown, and the motors 10 operate. When the motors 10 operate, the motors 10 rotate the wheels 50 via the couplings 7 and the gear boxes 9. As a result, the vehicle runs along the rails 1.

When the motors 10 operate, the internal fan 27a rotates integrally with the rotational shaft 21. Due to the drawing effect of this internal fan 27a, fresh air (cooling wind) blows into the second chamber 35b via the intake filter 36 from the first ventilation hole 34a of the control device 5. The cooling wind passes through the radiating fins 32 to cool the radiating fins 32, and thereafter, the cooling wind blows into a space on the side opposite to the load of the motor 10 by way of the ventilation duct 6. Thereafter, the cooling wind passes through the rotor duct 26 and the air gap, and cools the motor 10. Thereafter, the cooling wind passes through the internal fan 27a, and is discharged to the outside from the exhaust opening 28.

The heat generated by the switching devices 31 in the control device 5 during acceleration and deceleration of the vehicle is transmitted to the radiating fins 32 by way of the attachment base 33. The cooling wind blowing into the control device 5 from the first ventilation hole 34a removes heat from the radiating fins 32 when the cooling wind passes through the radiating fins 32, and the cooling wind blows into the motor 10. The cooling wind passes through the radiating fins 32 at a very high velocity. Therefore, the cooling wind has a high heat transfer rate, and thus can efficiently cool the control device 5.

As described above, the heat generated in the control device 5 is forcibly air-cooled by the passing cooling wind generated together with the operation of the vehicle, and thus the heat can be efficiently cooled. The velocity of the wind generated by the cooling fan of the motor 10 to cool the control device 5 is twice to ten times higher than the velocity of the natural wind received by the vehicle while the vehicle is running, though the velocity varies according to the number of rotations. Therefore, it is not necessary to arrange a large cooling device as used in a conventional control device, and the size of the control device can be greatly reduced.

When the vehicle runs, a vibration transmitted from the wheels 50 to the bogie 52 and a vibration generated by the motor 10 are attenuated by the air spring 54, and therefore the vibrations are less likely to be transmitted to the body 55 and the control device 5 attached to the body 55. On the other hand, the ventilation duct 6 connected between the motor 10 and the control device 5 is formed from a material having flexibility, and therefore, the vibrations generated by the bogie 52 and the motor 10 are attenuated by the ventilation duct, and are less likely to be transmitted to the control device 5.

Since the control device 5 is arranged in the portion under the floor of the body 55, it is not necessary to particularly add vibration-proof function to the control device 5. Therefore, the entire volume of the control device 5 is not increased due to the vibration-proof function.

Figure 4:
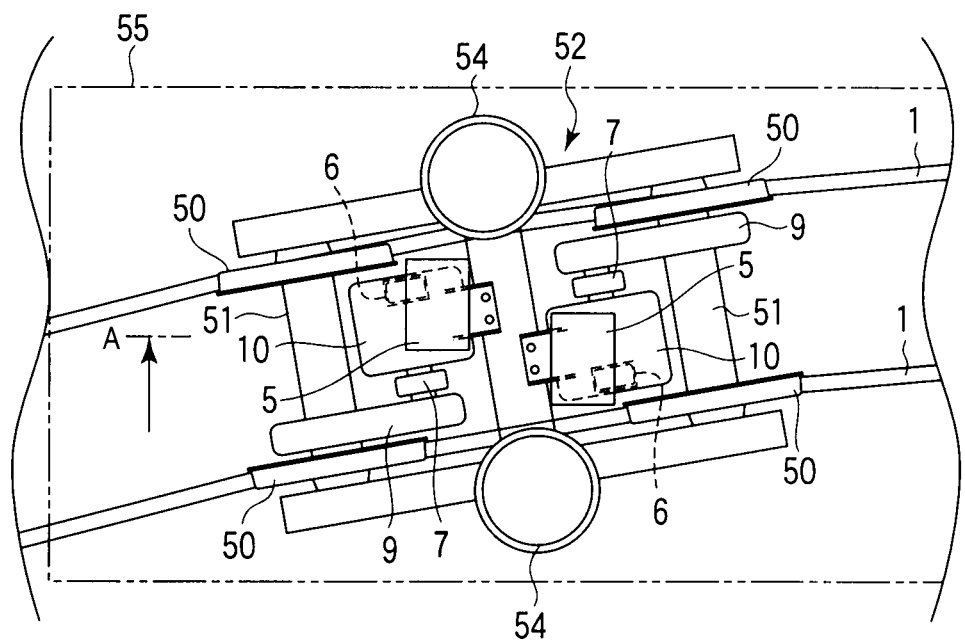
FIG. 4 is a top view illustrating the vehicle drive apparatus while a bogie of FIG. 1 runs along a curved section.

The motor 10 and the control device 5 are connected by a material having flexibility and a retractile structure. Therefore, even when the vehicle comes to a curve as shown in FIG. 4, the ventilation duct 6 easily deforms or expands/shrinks, and the blow of the cooling wind between the motor 10 and the control device 5 does not change. As a result, the cooling function can be maintained.

In general, the life span of the control device 5 is shorter than that of the motor 10. Therefore, only the control device 5 is replaced at some time. Even in such case, the control device 5 can be easily replaced by removing the control device 5 from the position below the floor and detaching the ventilation duct 6 from the control device 5. This improves the maintenancibility of the vehicle drive apparatus.

As described above, when the motor 10 and the control device 5 are arranged in proximity to each other, the control device 5 is forcibly air-cooled by the cooling wind generated by the rotation of the motor 10. Therefore, the vehicle drive apparatus having a higher degree of reliability can be obtained, wherein the volume of the control device 5 is smaller than those of conventional devices, and the vibrations generated by the bogie 52 and the motor 10 are not transmitted to the control device 5, whereby it is possible to prevent malfunction of the control device caused by the vibrations.

Second Embodiment

Subsequently, a vehicle drive apparatus according to the second embodiment will be explained.

Figure 5:
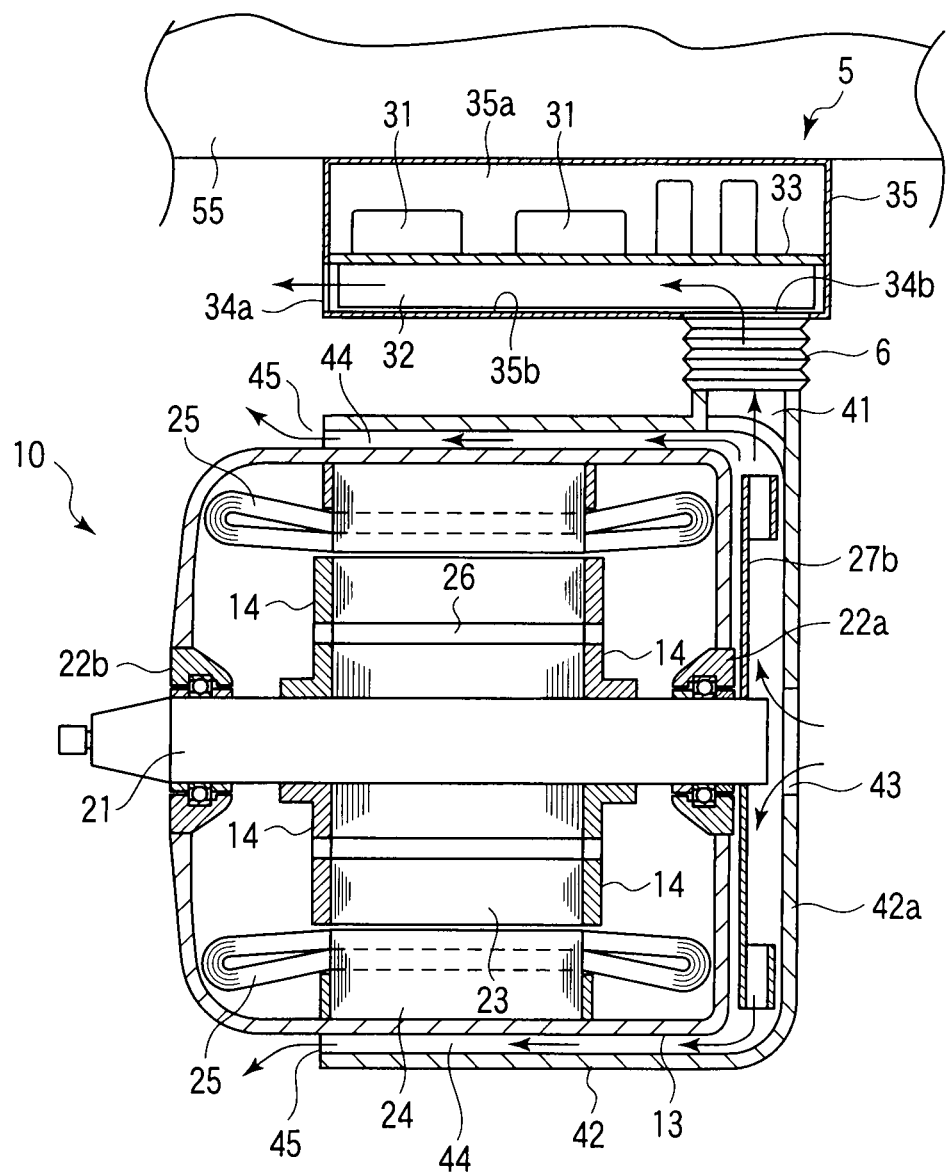
FIG. 5 is a longitudinal sectional view illustrating a vehicle drive apparatus according to a second embodiment.

FIG. 5 is a longitudinal sectional view illustrating the vehicle drive apparatus according to the second embodiment. In the figure, the same elements as those of the first embodiment are denoted with the same reference numerals, and the detailed description thereof is omitted.

In the second embodiment, a motor 10 is configured as an enclosed motor whose internal structure is enclosed by a motor frame 13. An end portion opposite to a load side of a rotational shaft 21 is attached with an external fan 27b serving as a cooling fan, and the external fan 27b is arranged on the outside of the motor frame 13. The external fan 27b is configured in a radial shape. The external dimension of the external fan 27b is determined in view of a desired amount of air and noise level.

For example, a cup-shaped cover 42 is arranged so as to cover the end portion opposite to the load side and the external peripheral portion of the external fan 27b and the motor frame 13. The cover 42 faces the external surface of the motor frame 13 with a gap therebetween. An air path 44, through which a cooling wind blows, is formed by this gap. At the external peripheral portion of the motor frame 13, the air path 44 is open toward the load side of the motor 10 via an exhaust opening 45. An intake hole 43 is formed in a central portion of an end wall 42a of the cover 42 facing the external fan 27b. This intake hole 43 is in communication with the air path 44 and faces a rotational central portion of the external fan 27b. The motor having the above structure is called a totally enclosed external fan-cooled motor.

At an outer side in a radial direction of the external fan 27b, a connection duct 41 is integrally formed with the cover 42, and extends to the outer side in the radial direction from the cover. Further, a blow-out end of the connection duct 41 is connected to a ventilation duct 6, which is connected to the casing 35 of the control device 5.

In the present embodiment, no internal fan is arranged in the motor 10. However, the internal fan may be arranged as necessary if it is necessary to lubricate the inside of the motor. In such case, the motor 10 is configured to maintain the enclosure so as not to be in communication with the outside air.

The structure of the vehicle drive apparatus except for the above feature and the structure of vehicle are the same as those of the first embodiment explained above.

In the vehicle drive apparatus having the above structure, due to the drawing effect caused by the rotation of the external fan 27b, external air (cooling wind) blows into the air path 44 from the intake hole 43 of the cover 42 arranged in proximity to the side opposite to the load side of the rotational shaft 21, and the external air is divided into the connection duct 41 and the external periphery of the motor frame 13 by way of the external fan 27b. Subsequently, the cooling wind having blown into the connection duct 41 passes through the ventilation duct 6, and the cooling wind blows into the control device 5 through a second ventilation hole 34b. Subsequently, the cooling wind blows around the radiating fins 32, and cools the radiating fins 32. Thereafter, the cooling wind is discharged through a first ventilation hole 34a to the outside of the control device 5. Therefore, the heat generated by a switching device 31 and other devices of the control device 5 is radiated to the cooling wind via the attachment base 33 and the radiating fins 32. As a result, the control device 5 is cooled.

Further, the cooling wind having passed through the air path 44 blows along the external periphery of the motor frame 13. Thereafter, the cooling wind is discharged to the outside through the exhaust opening 45. At this occasion, the cooling wind removes heat generated by a stator core 24 and a stator coil 25 and transmitted to the motor frame 13, thus cooling the motor 10.

According to the vehicle drive apparatus having the above structure, the control device 5 can be cooled by the cooling wind generated by the cooling fan of the motor 10. At this occasion, the cooling wind whose temperature has not yet risen reaches the control device 5, thus efficiently cooling the control device 5. Further, the heat generated in the motor 10 can be discharged to the outside by the cooling wind blowing around the motor frame 13, and therefore, sufficient cooling effect can also be obtained in the motor having the enclosed structure.

In the first embodiment explained above, the cooling wind having drawn heat from the control device 5 blows into the motor 10, and therefore, the wind having a higher temperature than that of the fresh air is introduced into the motor 10. In contrast, in the second embodiment, the cooling wind whose temperature has not yet risen can be blown into not only the control device 5 but also the motor 10. Therefore, the control device 5 and the motor 10 can be cooled more efficiently.

The vibration prevention effect and other effects similar to the first embodiment are also obtained in the second embodiment.

Third Embodiment

Subsequently, a vehicle drive apparatus according to a third embodiment will be explained.

Figure 6:
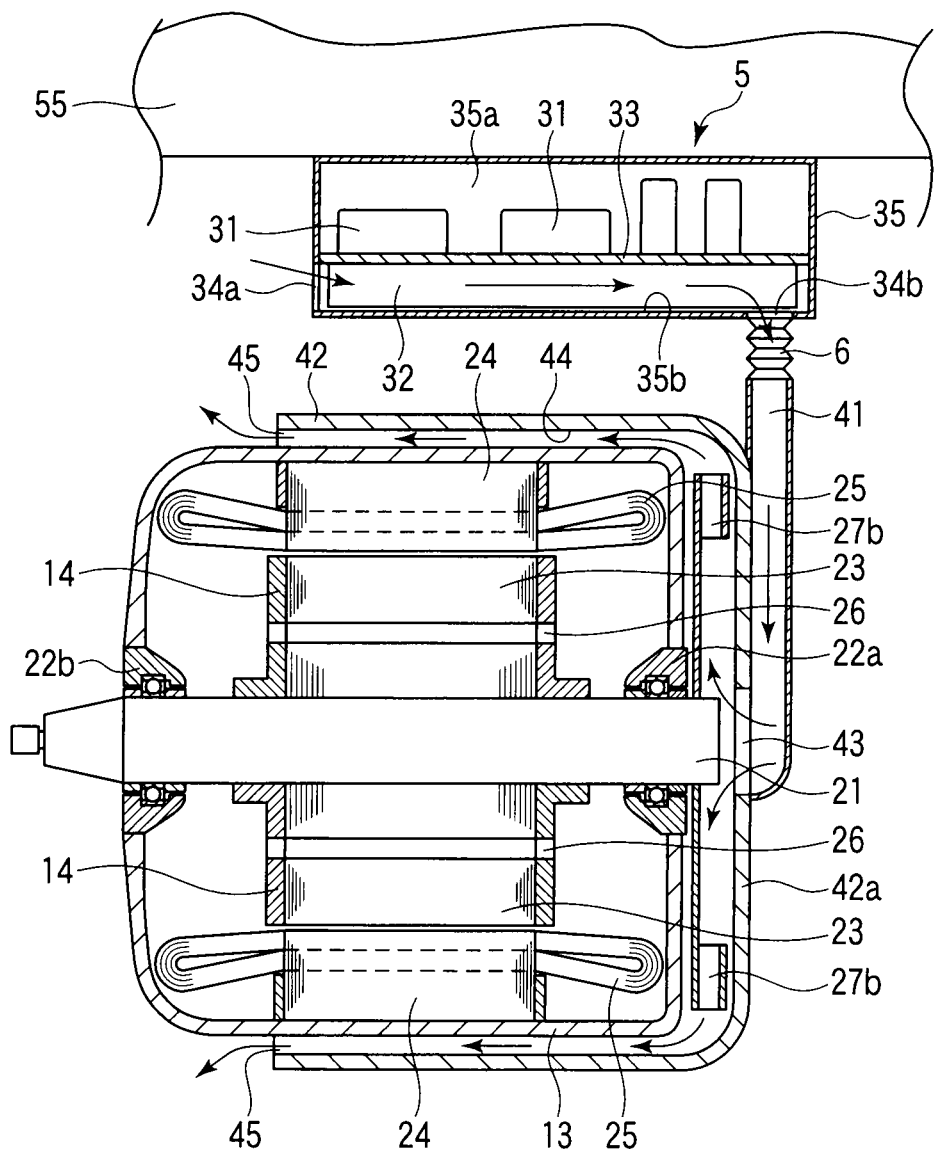
FIG. 6 is a longitudinal sectional view illustrating a vehicle drive apparatus according to a third embodiment.

FIG. 6 is a longitudinal sectional view illustrating the vehicle drive apparatus according to the third embodiment. In the figure, the same elements as those of the second embodiment are denoted with the same reference numerals, and the detailed description thereof is omitted.

In the third embodiment, a motor 10 is structured as an enclosed motor. An end portion opposite to a load side of a rotational shaft 21 is attached with an external fan 27b. For example, a cup-shaped cover 42 is arranged so as to cover the end portion opposite to the load side and the external peripheral portion of the external fan 27b and a motor frame 13. The cover 42 faces the external surface of the motor frame 13 with a gap therebetween. An air path 44, through which a cooling wind blows, is formed by this gap. At the external peripheral portion of the motor frame 13, the air path 44 is open toward the load side of the motor 10 via an exhaust opening 45.

An intake hole 43 is formed in a central portion of an end wall 42a of the cover 42 facing the external fan 27b. This intake hole 43 is in communication with the air path 44 and faces a rotational central portion of the external fan 27b. A connection duct 41 is arranged on an end wall 42a of the cover 42. One end of the connection duct 41 is connected to the intake hole 43, and the other end thereof is connected to a ventilation duct 6. The shape of the connection duct 41 is not particularly limited. The connection duct 41 is in any form as long as the cooling wind can blow therethrough. The size of the area in the duct is preferably as large as possible within a dimensional limitation in order to reduce air blow resistance.

The structure of the vehicle drive apparatus except for the above feature and the structure of vehicle are the same as those of the second embodiment explained above.

In the vehicle drive apparatus having the above structure, due to the drawing effect caused by the rotation of the external fan 27b, external air (cooling wind) blows into the second chamber 35b from the first ventilation hole 34a of the control device 5. The cooling wind passes through the radiating fins 32 to cool the radiating fins 32. Thereafter, the cooling wind passes through the ventilation duct 6 and the connection duct 41, and blows into the air path 44 through the intake hole 43. Thereafter, the cooling wind blows around the motor frame 13 by way of the external fan 27b, and is discharged through the exhaust opening 45.

According to the above structure, all the cooling wind blowing around the motor passes through the control device 5 even in the totally enclosed external fan-cooled motor. Therefore, the cooling performance of the control device 5 can be improved. Further, since the motor has the enclosed structure, no dust enters the motor, and the maintenancibility can be improved.

Fourth Embodiment

Subsequently, a vehicle drive apparatus according to a fourth embodiment will be explained.

Figure 7:
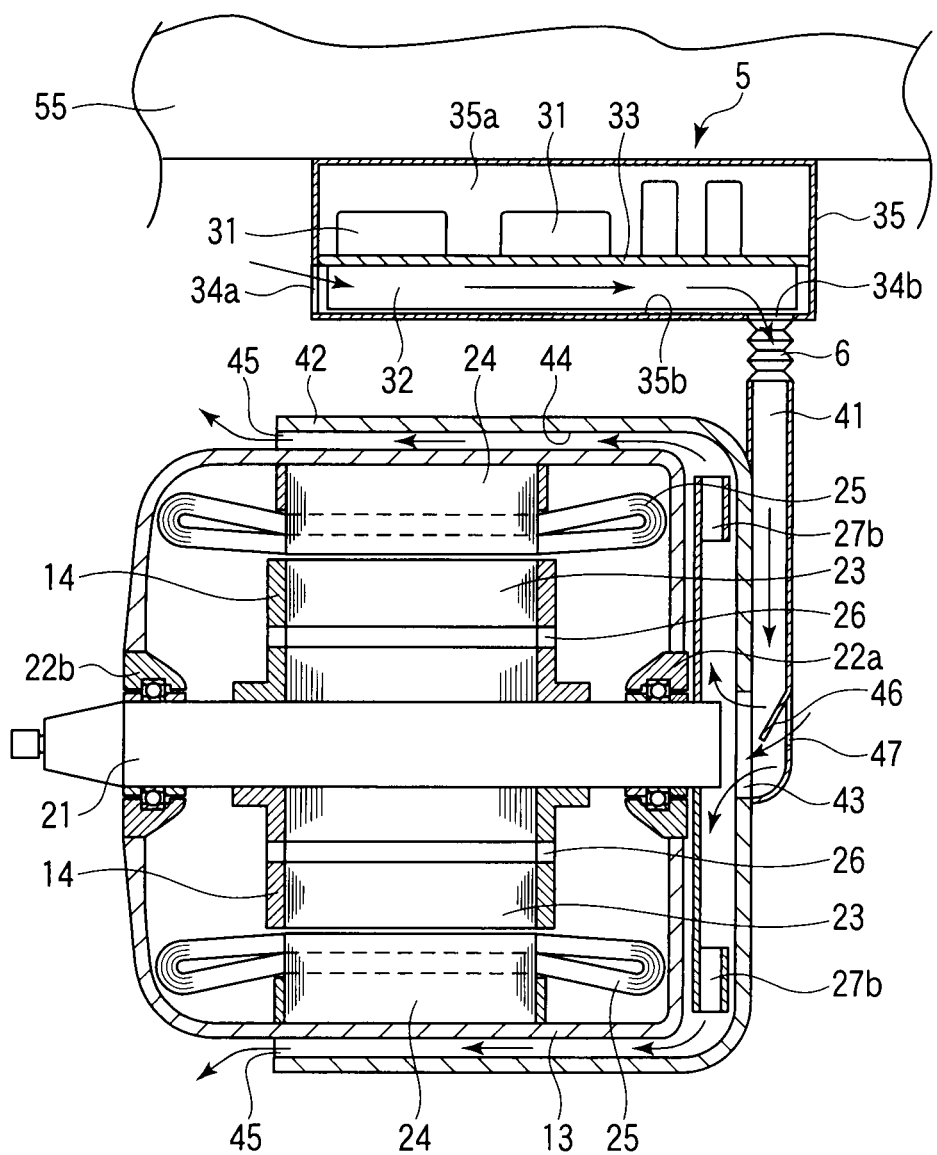
FIG. 7 is a longitudinal sectional view illustrating a vehicle drive apparatus according to a fourth embodiment.

FIG. 7 is a longitudinal sectional view illustrating the vehicle drive apparatus according to the fourth embodiment. In the figure, the same elements as those of the third embodiment are denoted with the same reference numerals, and the detailed description thereof is omitted.

In the fourth embodiment, a blow-in opening 47 is arranged at, for example, a position facing an intake hole 43 in a connection duct 41 of the structure according to the third embodiment. Further, an intake adjustment valve 46 is arranged to open/close this blow-in opening 47. The intake adjustment valve 46 is rotatably supported by, for example, a hinge. When a motor 10 is not operating, the blow-in opening 47 maintains a closed state. Any structure, such as spring, gravity, and magnet, can be freely used as the structure for closing the intake adjustment valve 46.

The structure of the vehicle drive apparatus except for the above feature and the structure of vehicle are the same as those of the third embodiment explained above.

In the vehicle drive apparatus having the above structure, when the motor 10 operates, and a cooling wind blows into the connection duct 41 according to the rotation of the cooling fan 27b, a pressure difference is generated between the external air side and the inner duct side of the intake adjustment valve 46. As the flow velocity of the cooling wind in the connection duct 41 increases, the pressure difference further increases. Accordingly, the intake adjustment valve 46 opens to the connection duct side having a lower pressure, which causes the blow-in opening 47 to be in an opened state.

In this state, the external air blows through the blow-in opening 47 and the intake adjustment valve 46 into the connection duct 41, and the external air mixes with the wind having passed the control device 5.

Then, the external air blows into the external fan 27b. This generation of the blow can suppress the volume of the cooling wind passing through the control device 5, and can reduce temperature variation of the switching devices 31 in the control device 5. In other words, when the motor 10 rotates at a high velocity, and the flow amount of cooling wind increases, the control device 5 may be excessively cooled, which may reduce the temperature of the control device 5. During this high speed operation of the motor 10, the external air is introduced through the blow-in opening 47, so that the flow amount of the cooling wind flowing in the control device 5 is reduced. This prevents excessive cooling of the control device 5, and the control device 5 can be maintained at a desired temperature.

According to the above structure, the cooling wind whose temperature has not yet risen blows into the external fan 27b without passing through the control device 5. Accordingly, the temperature of the cooling wind itself can be reduced, and the amount of heat absorption can be increased when the cooling wind passes through the air path 44 of the motor 10. Therefore, the cooling performance of the motor 10 can be further increased.

Fifth Embodiment

Subsequently, a vehicle drive apparatus according to a fifth embodiment will be explained.

Figure 8:
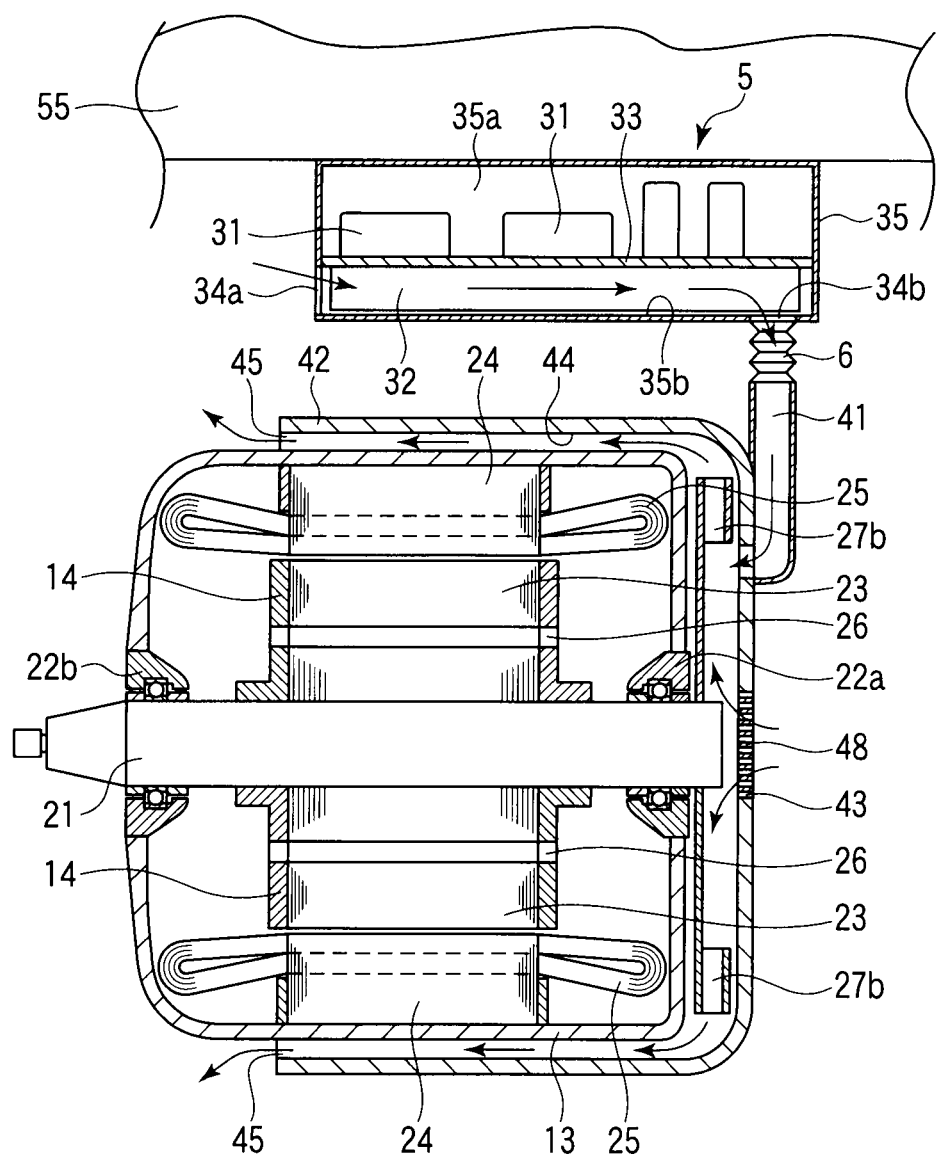
FIG. 8 is a longitudinal sectional view illustrating a vehicle drive apparatus according to a fifth embodiment.

FIG. 8 is a longitudinal sectional view illustrating the vehicle drive apparatus according to the fifth embodiment. In the figure, the same elements as those of the third embodiment are denoted with the same reference numerals, and the detailed description thereof is omitted.

In the fifth embodiment, an intake hole 43 is formed in a central portion of an end wall 42a of a cover 42 facing an external fan 27b, and faces a central axis of the external fan 27b. An intake adjustment filter 48 is arranged to suppress the amount of the cooling wind drawn through the intake hole 43. One end of a connection duct 41 is connected to the cover 42 at a position facing an external peripheral portion of the external fan 27b, and is in communication with an air path 44. The other end of the connection duct 41 is connected to a ventilation duct 6.

The structure of the vehicle drive apparatus except for the above feature and the structure of vehicle are the same as those of the third embodiment explained above.

In the vehicle drive apparatus having the above structure, when a motor 10 operates, and the cooling fan 27b rotates, the cooling wind is generated. The cooling wind having passed through the control device 5 passes through the ventilation duct 6 and the connection duct 41, and blows into the air path 44 through the blow-in opening in proximity to the external periphery of the external fan 27b. Then, the cooling wind blows into the external fan 27b. Further, the cooling wind passes through the air path 44 to cool the motor 10. Thereafter, the cooling wind is discharged through an exhaust opening 45. When the rotational velocity of the motor 10 increases, and the drawing effect increases according to the rotation of the external fan 27b, the cooling wind blows from the intake adjustment filter 48 to the air path 44. Thereafter, the cooling wind blows into the external fan, and mixes with a wind blowing from the control device 5.

The cooling wind blows as described above. Since a portion of the wind blows through the intake adjustment filter 48, the amount of the cooling wind passing through the control device 5 can be adjusted, and the temperature variation of the switching devices 31 in the control device 5 can be reduced. Further, the cooling wind whose temperature has not yet risen blows into the external fan 27b without passing through the control device 5. Accordingly, the temperature of the cooling wind itself can be reduced, and the amount of heat absorption can be increased when the cooling wind passes through the air path 44 of the motor 10. Therefore, the cooling performance of the motor 10 can be further increased.

Sixth Embodiment

Subsequently, a vehicle drive apparatus according to a sixth embodiment will be explained.

Figure 9:
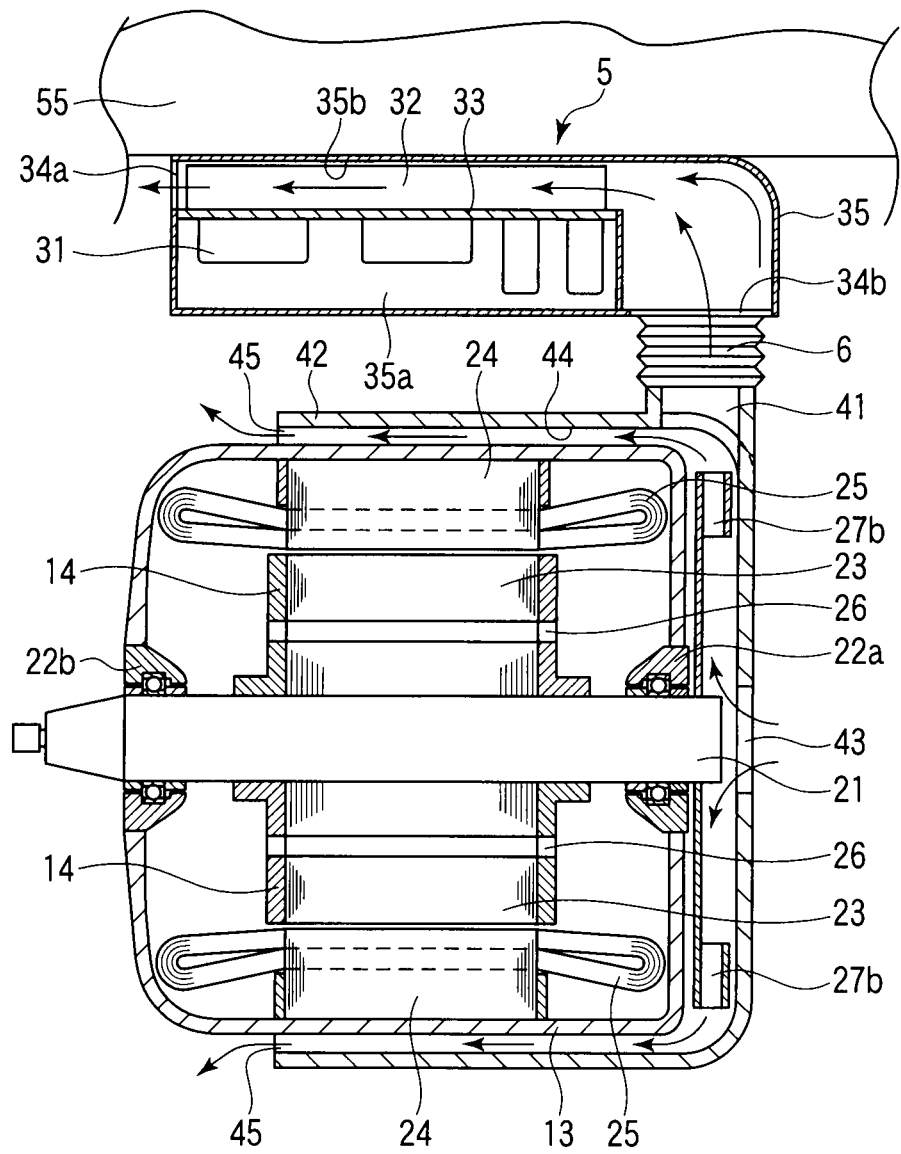
FIG. 9 is a longitudinal sectional view illustrating a vehicle drive apparatus according to a sixth embodiment.

FIG. 9 is a side view illustrating the vehicle drive apparatus according to the sixth embodiment. In the figure, the same elements as those of the second embodiment are denoted with the same reference numerals, and the detailed description thereof is omitted.

In the sixth embodiment, in a control device 5, switching devices 31 are arranged on a lower portion of an attachment base 33, and radiating fins 32 are arranged on an upper portion of the attachment base 33. At an outer side in a radial direction of the external fan 27b, a connection duct 41 is integrally formed with a cover 42, and extends to the outer side in the radial direction from the cover. Further, a blow-out end of the connection duct 41 is connected to a ventilation duct 6. The ventilation duct 6 is connected to a casing 35 of the control device 5, and is in communication with a second chamber 35 via a second ventilation hole 34b.

The structure of the vehicle drive apparatus except for the above feature and the structure of vehicle are the same as those of the second embodiment as explained above.

In the vehicle drive apparatus having the above structure, due to the drawing effect caused by the rotation of the external fan 27b, a cooling wind blows into an air path 44 from an intake hole 43 of the cover 42 arranged in proximity to the side opposite to the load side of a rotational shaft 21, and is separated into the connection duct 41 and the external periphery of a motor frame 13 by way of the external fan 27b. Subsequently, the cooling wind having blown into the connection duct 41 passes through the ventilation duct 6, and blows into the control device 5 through the second ventilation hole 34b. Subsequently, the cooling wind blows around the radiating fins 32, and cools the radiating fins 32. Thereafter, the cooling wind is discharged through a first ventilation hole 34a to the outside of the control device 5. Therefore, the heat generated by the switching devices 31 and other devices of the control device 5 is radiated to the cooling wind via the attachment base 33 and the radiating fins 32. As a result, the control device 5 is cooled.

Further, the cooling wind having passed through the air path 44 blows along the external periphery of the motor frame 13. Thereafter, the cooling wind is discharged to the outside through the exhaust opening 45. At this occasion, the cooling wind removes heat generated by a stator core 24 and a stator coil 25 and transmitted to the motor frame 13, thus cooling the motor 10.

According to this structure, even when the motor 10 stops operation, and the cooling wind does not blow, the heat generated by the switching devices 31 is conducted upward. In other words, the heat is conducted via the attachment base 33 to the radiating fins 32. Upward natural convection occurs around the radiating fins 32, and the heat escapes to an upper portion. Therefore, when the motor stops, the temperature rise of the switching devices can be suppressed, compared with a case where the switching devices 31 are arranged at an upper portion of the attachment base 33.

Seventh Embodiment

Subsequently, a vehicle drive apparatus according to a seventh embodiment will be explained.

Figure 10:
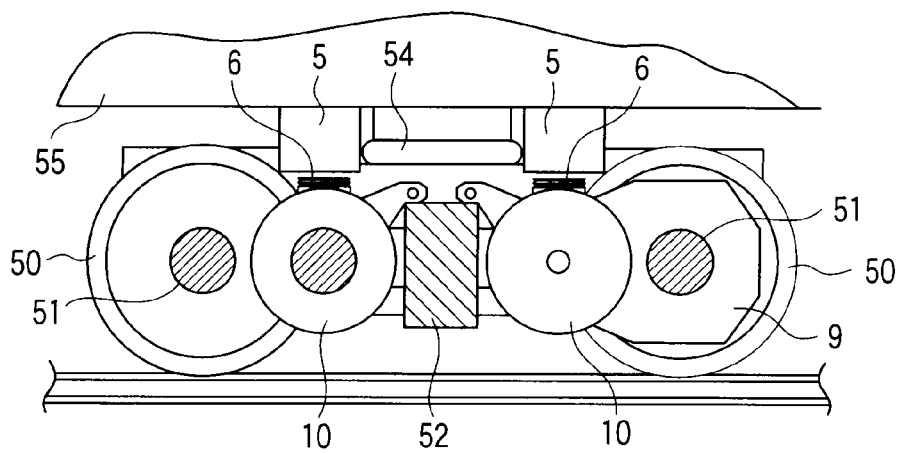
FIG. 10 is a sectional view, corresponding to FIG. 2, illustrating a vehicle drive apparatus according to a seventh embodiment.

FIG. 10 is a side view illustrating the vehicle drive apparatus according to the seventh embodiment. In the figure, the same elements as those of the first embodiment are denoted with the same reference numerals, and the detailed description thereof is omitted.

In the sixth embodiment, a ventilation duct 6 arranged between a motor 10 and a control device 5 does not completely connect the motor 10 and the control device 5. A gap is formed between the motor 10 and the control device 5. In other words, the ventilation duct 6 is formed such that a portion thereof is divided. In the present embodiment, one end of the ventilation duct 6 is connected to the motor 10, and the other end of the ventilation duct 6 faces a casing 35 of the control device 5 with a gap formed between the ventilation duct 6 and the control device 5. The structure of the third embodiment except for the above feature is the same as that of the first embodiment.

According to the vehicle drive apparatus having the above structure, a cooling wind generated by rotation of the motor 10 is drawn and discharged as follows. Like the first embodiment, the cooling wind blows through the ventilation duct 6, and passes through the control device 5. The cooling wind is slightly drawn and discharged through the gap of the ventilation duct 6. However, the basic flow is the same as that of the first embodiment. Therefore, the control device 5 can be efficiently cooled by the cooling wind generated by the cooling fan of the motor 10.

Like the first embodiment, a vibration generated by the wheels 50 and a vibration generated by the motors 10 are not transmitted to the control device 5 while the vehicle is running. When a bogie 52 vibrates greatly, and an air spring 54 greatly deforms in a vertical direction, the gap of the ventilation duct 6 is temporarily eliminated.

Further, as shown in FIG. 4, while the vehicle runs on a curve, a displacement occurs between the position of the motor 10 and the position of the control device 5. However, the ventilation duct 6 does not deform because the motor 10 and the control device 5 are not completely connected. Therefore, fatigue of the ventilation duct 6 due to deformation does not occur. As a result, the life span of the ventilation duct becomes longer, and the replacing frequency can be reduced. Moreover, since the gap is very small, only a minimum amount of dusts enters through the gap.

The vibration prevention effect and other effects similar to the first embodiment are also obtained in the seventh embodiment.

Figure 11:
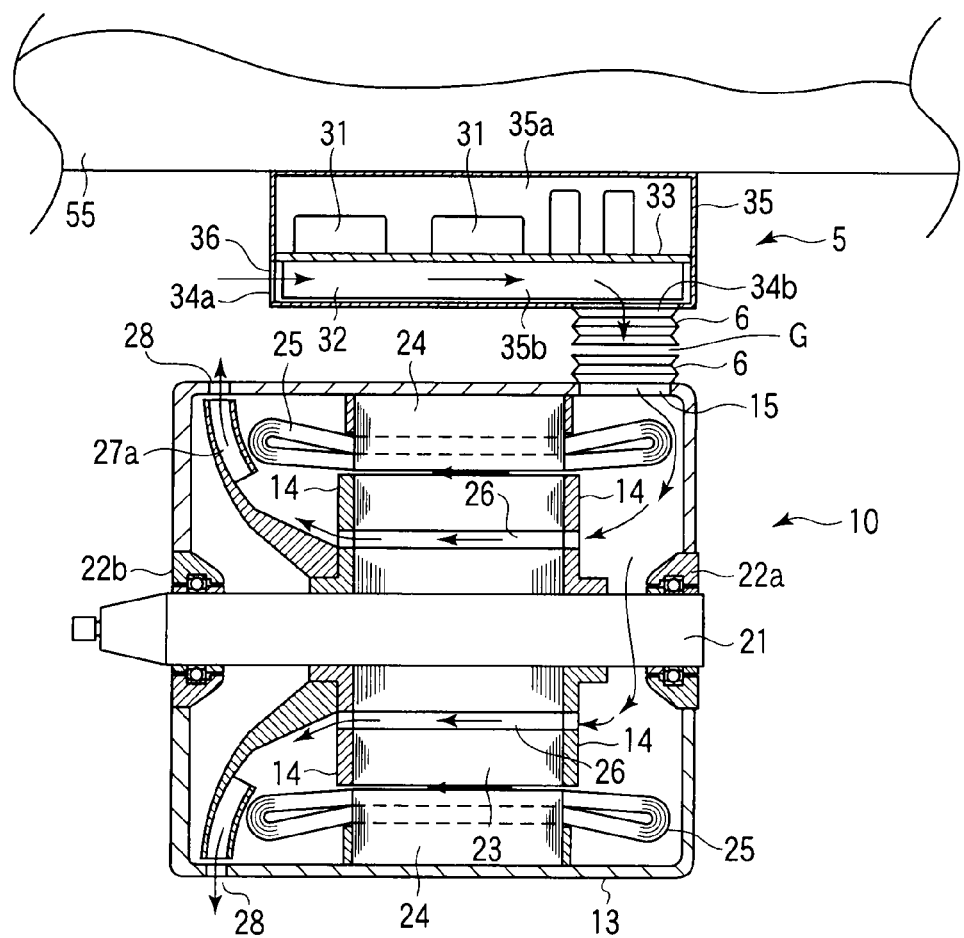
FIG. 11 is a longitudinal sectional view illustrating a vehicle drive apparatus according to a modification of the second embodiment.

In the seventh embodiment, the dividing structure of the ventilation duct 6 is not limited to the above case. For example, one end of the ventilation duct 6 may be connected to the control device 6, and a gap may be formed between the other end of the ventilation duct 6 and the motor 10. Alternatively, as shown in FIG. 11, a gap G may be formed in an intermediate portion of the ventilation duct 6. The size of the gap is preferably several millimeters to several dozen millimeters. It should be noted that the motor 10 is not limited to the self-ventilated type. An enclosed external fan-cooled type may also be used.

Eighth Embodiment

Subsequently, a vehicle drive apparatus according to an eighth embodiment will be explained.

FIG. 12 is a side view illustrating the vehicle drive apparatus according to the eighth embodiment. In the figure, the same elements as those of the first embodiment are denoted with the same reference numerals, and the detailed description thereof is omitted.

In the eight embodiment, a vibration isolator 11 is arranged between each control device 5 and a body 55. In the present embodiment, the vibration isolator 11 is constituted by a coil spring. However, the vibration isolator 11 is not limited thereto. A rubber vibration isolator, wire rope-type vibration isolator, gel material, and the like may be appropriately selected as the vibration isolator 11 as long as it has a predetermined vibration isolating function.

In the eighth embodiment, the structure of the vehicle drive apparatus except for the above feature is the same as that of the first embodiment explained above. The flow of the cooling wind is the same as that of the first embodiment.

According to the vehicle drive apparatus having the above structure, the vibration isolator 11 is arranged between the control device 5 and the body 55. Therefore, the vibration exerted on the control device 5 can be further reduced. Since the motor 10 and the control device 5 are connected by a ventilation duct 6, the vibration may be slightly transmitted to the control device 5 via the ventilation duct 6. However, the vibration isolator 11 can suppress this vibration. Therefore, the reliability against malfunction of the control device 5 can be further improved.

Regarding other features, the same actions and effects as those of the first embodiment can also be obtained in the eighth embodiment.

Ninth Embodiment

Subsequently, a vehicle drive apparatus according to a ninth embodiment will be explained.

FIG. 13 is a longitudinal sectional view illustrating the vehicle drive apparatus according to the ninth embodiment. In the figure, the same elements as those of the first embodiment are denoted with the same reference numerals, and the detailed description thereof is omitted.

In the ninth embodiment, a control device 5 is provided with a control device cooling fan 40, and a ventilation duct 6 is arranged between the control device 5 and a motor 10. The control device cooling fan 40 is arranged to face a first ventilation hole 34a formed on a casing 35 of the control device 5. In the present embodiment, an axial fan is used as the control device cooling fan 40. However, the control device cooling fan 40 is not limited thereto. A centrifugal fan, a sirocco fan, and the like may be used as the control device cooling fan 40 as long as the fan provides a desired amount of wind.

The motor 10 may be the self-ventilated motor as shown in the figure, or may be the enclosed external fan-cooled motor as explained above. The motor 10 may be of any type as long as it has a structure of a motor for generating cooling wind along with rotation. In the ninth embodiment, the structure except for the above feature is the same as that of the first embodiment.

In the vehicle drive apparatus having the above structure, due to drawing effect caused by rotation of an internal fan 27a of the motor 10, a cooling wind blows into the motor 10 via radiating fins 32 of the control device 5 and the ventilation duct 6. Thereafter, the cooling wind is discharged to the outside of the motor 10 through an exhaust opening 28. At this occasion, the control device cooling fan 40 of the first ventilation hole 34a of the control device 5 is activated. Accordingly, the control device cooling fan 40 provides a higher degree of drawing effect, which increases the velocity of the cooling wind passing through the radiating fins 32. Therefore, the cooling performance of the control device 5 can be improved.

In a case where the motor has other structures, i.e., the motor is of the totally enclosed external fan-cooled type, the control device cooling fan 40 rotates in the opposite direction. In this case, the cooled air is discharged from the control device 5.

As described above, according to the ninth embodiment, the control device 5 can be cooled more efficiently by combining the drawing/discharging effect caused by the rotation of the motor 10 and the drawing/pushing effect caused by the control device cooling fan 40. Regarding other features, the same actions and effects as those of the first embodiment can also be obtained in the ninth embodiment.

Tenth Embodiment

Subsequently, a vehicle drive apparatus according to a tenth embodiment will be explained.

Figure 14:
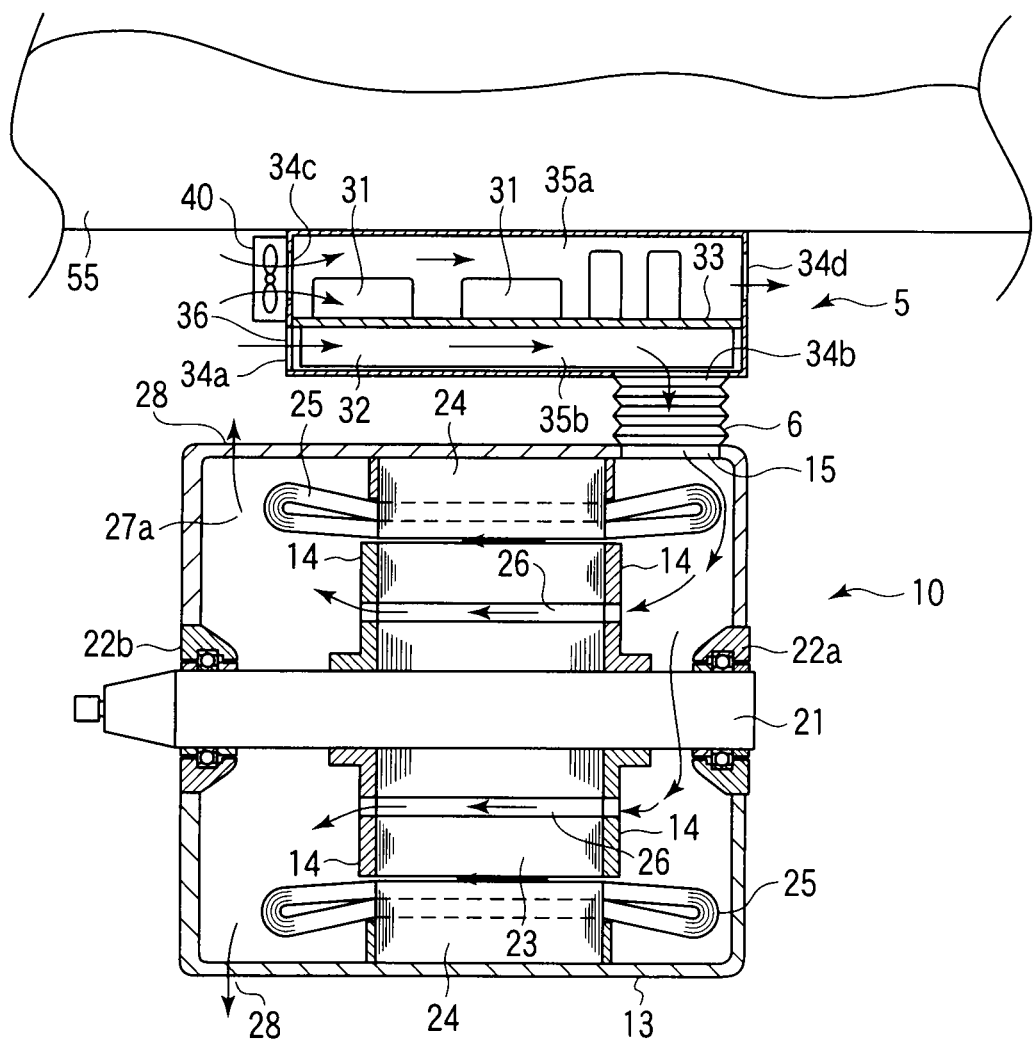
FIG. 14 is a longitudinal sectional view illustrating a vehicle drive apparatus according to a tenth embodiment.

FIG. 14 is a longitudinal sectional view illustrating the vehicle drive apparatus according to the tenth embodiment. In the figure, the same elements as those of the first embodiment are denoted with the same reference numerals, and the detailed description thereof is omitted.

In the tenth embodiment, a control device 5 is provided with a control device cooling fan 40, and a ventilation duct 6 is arranged between the control device 5 and a motor 10. A casing 35 of the control device 5 includes a third ventilation hole 34c formed in a first chamber 35a at one end side in a longitudinal direction of the radiating fins 32 and a fourth ventilation hole 34d formed in the first chamber 35a at the other end side in the longitudinal direction of the radiating fins 32. The control device cooling fan 40 is arranged on the casing 35 to face the third ventilation hole 34c. An axial fan, a centrifugal fan, a sirocco fan, and the like may be used as the control device cooling fan 40. The fourth ventilation hole 34d may be provided with a filter for dust removal.

The ventilation duct 6 is arranged between the control device 5 and the motor 10, and the ventilation duct 6 is in communication with a second chamber 35b of the control device 5. The motor 10 may be the self-ventilated motor as shown in the figure, or may be the enclosed external fan-cooled motor as explained above. The motor 10 may be of any type as long as it has a structure of a motor for generating cooling wind according to rotation.

The structure of the tenth embodiment except for the above feature is the same as that of the first embodiment.

In the vehicle drive apparatus having the above structure, due to drawing effect caused by rotation of an internal fan 27a of the motor 10, a cooling wind blows into the motor 10 via radiating fins 32 of the control device 5 and the ventilation duct 6. Thereafter, the cooling wind is discharged to the outside of the motor 10 through an exhaust opening 28. On the other hand, when the control device cooling fan 40 of the third ventilation hole 34c of the control device 5 is activated, the control device cooling fan 40 provides drawing effect, which blows the cooling air into the first chamber 35a to cool the switching devices 31 and other devices. Thereafter, the cooling air is discharged to the outside of the control device 5 through the fourth ventilation hole 34d. Therefore, the control device 5 can be efficiently cooled by the heat radiation of the radiating fins 32 and the direct cooling by the cooling wind.

In a case where the motor has other structures, i.e., the motor is of the totally enclosed external fan-cooled type, the control device cooling fan 40 rotates in the opposite direction. In this case, the cooled air is discharged from the control device 5.

As described above, according to the tenth embodiment, the control device 5 can be cooled more efficiently by combining the drawing/discharging effect caused by the rotation of the motor 10 and the drawing/pushing effect caused by the control device cooling fan 40. Regarding other features, the same actions and effects as those of the first embodiment can also be obtained in the tenth embodiment.

Eleventh Embodiment

Subsequently, a vehicle drive apparatus according to an eleventh embodiment will be explained.

Figure 15:
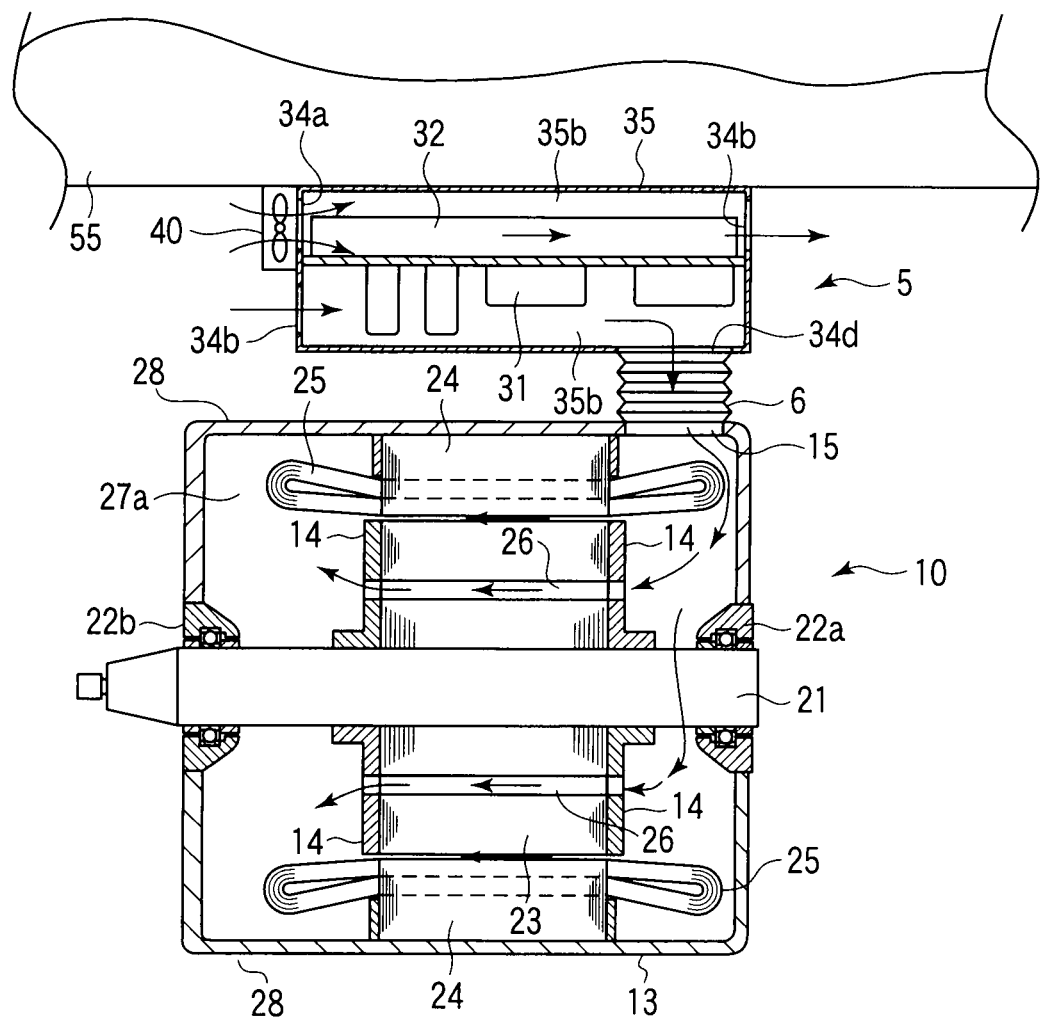
FIG. 15 is a longitudinal sectional view illustrating a vehicle drive apparatus according to an eleventh embodiment.

FIG. 15 is a longitudinal sectional view illustrating the vehicle drive apparatus according to the eleventh embodiment. In the figure, the same elements as those of the first embodiment are denoted with the same reference numerals, and the detailed description thereof is omitted.

In the eleventh embodiment, a control device 5 is arranged in a direction opposite to the direction of the embodiments explained above. That is, an attachment base 33 of the control device 5 is arranged in a substantially horizontal manner, and the control device 5 is arranged such that switching devices 31 and other devices arranged on the attachment base are located on the side of the motor 10 and that many radiating fins 32 arranged on the attachment base are located on the side of a body 55.

The control device 5 is provided with a control device cooling fan 40, and a ventilation duct 6 is arranged between the control device 5 and the motor 10. A casing 35 of the control device 5 includes a first ventilation hole 34a formed in a second chamber 35b at one end side in a longitudinal direction of the radiating fins 32 and a second ventilation hole 34b formed in the second chamber 35b at the other end side in the longitudinal direction of the radiating fins 32. Further, the casing 35 includes a third ventilation hole 34c formed in a first chamber 35a at the one end side in the longitudinal direction of the radiating fins 32 and a fourth ventilation hole 34d formed in the first chamber 35a at the other end side in the longitudinal direction of the radiating fins 32. The control device cooling fan 40 is arranged on the casing 35 to face the first ventilation hole 34a. An axial fan, a centrifugal fan, a sirocco fan, and the like may be used as the control device cooling fan 40.

The ventilation duct 6 is arranged between the control device 5 and the motor 10. One end of the ventilation duct 6 is in communication with the casing 35, and is in communication with the second chamber 35b of the control device 5 via the fourth ventilation hole 34d. The third ventilation hole 34c may be provided with a filter and the like for collecting dusts and the like. The motor 10 may be the self-ventilated motor as shown in the figure, or may be the enclosed external fan-cooled motor as explained above. The motor 10 may be of any type as long as it has a structure of a motor for generating cooling wind according to rotation.

The structure of the eleventh embodiment except for the above feature is the same as that of the first embodiment.

In the vehicle drive apparatus having the above structure, due to drawing effect caused by rotation of an internal fan 27a of the motor 10, a cooling wind is guided to the first chamber 35a of the control device 5, and blows around the switching devices 31 and other devices. Thereafter, the cooling wind blows into the motor 10 via the ventilation duct 6. Thereafter, the cooling wind is discharged to the outside of the motor 10 through an exhaust opening 28. On the other hand, when the control device cooling fan 40 of the first ventilation hole 34a of the control device 5 is activated, the control device cooling fan 40 provides drawing effect, which blows the cooling air into the second chamber 35b to cool the radiating fins 32. Thereafter, the cooling air is discharged to the outside of the control device 5 through the second ventilation hole 34b. Therefore, the control device 5 can be efficiently cooled by the heat radiation of the radiating fins 32 and the direct cooling by the cooling wind.

In a case where the motor has other structures, i.e., the motor is of the totally enclosed external fan-cooled type, the control device cooling fan 40 rotates in the opposite direction. In this case, the cooled air is discharged from the control device 5.

As described above, according to the eleventh embodiment, the control device 5 can be cooled more efficiently by combining the drawing/discharging effect caused by the rotation of the motor 10 and the drawing/pushing effect caused by the control device cooling fan 40. Regarding other features, the same actions and effects as those of the first embodiment can also be obtained in the eleventh embodiment.

Twelfth Embodiment

Subsequently, a vehicle drive apparatus according to a twelfth embodiment will be explained.

Figure 16:
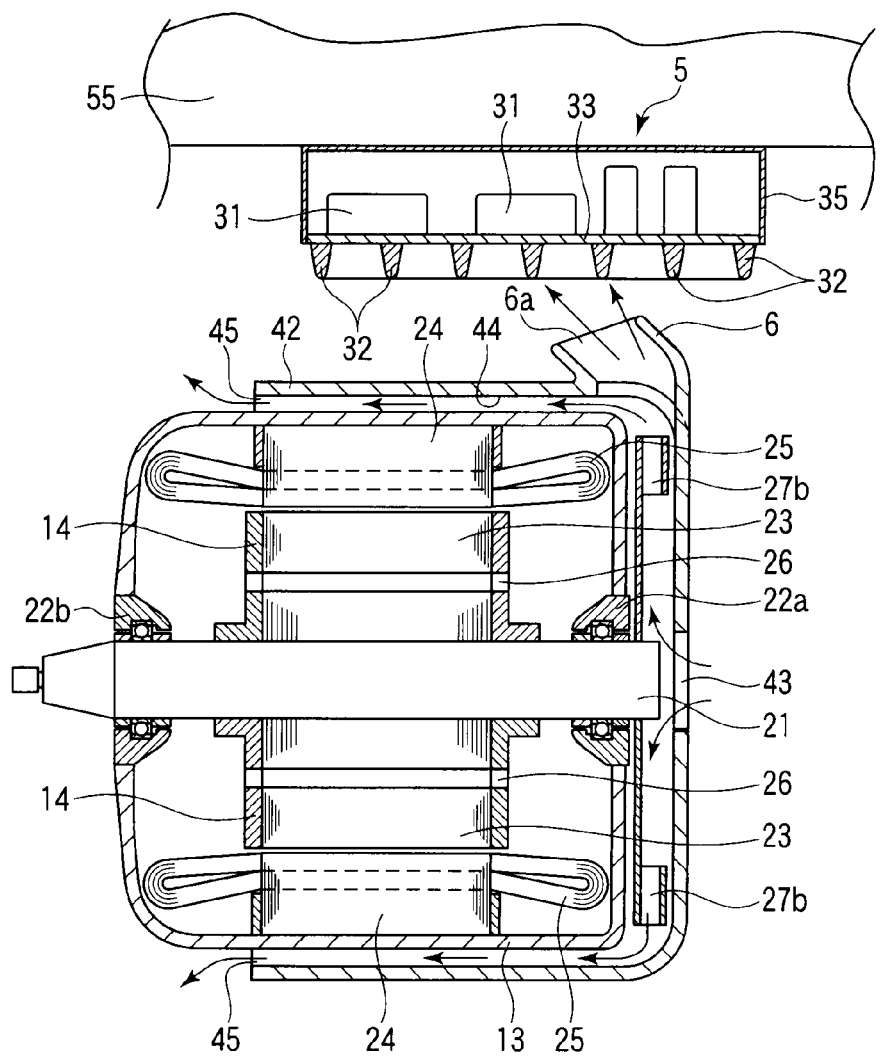
FIG. 16 is a longitudinal sectional view illustrating a vehicle drive apparatus according to a twelfth embodiment.

FIG. 16 is a longitudinal sectional view illustrating the vehicle drive apparatus according to the twelfth embodiment. In the figure, the same elements as those of the second embodiment are denoted with the same reference numerals, and the detailed description thereof is omitted.

In the twelfth embodiment, a motor 10 is structured as an enclosed motor. An end portion opposite to a load side of a rotational shaft 21 is attached with an external fan 27b. For example, a cup-shaped cover 42 is arranged so as to cover the end portion opposite to the load side and the external peripheral portion of the external fan 27b and a motor frame 13. The cover 42 faces the external surface of the motor frame 13 with a gap formed therebetween. An air path 44, through which a cooling wind blows, is formed by this gap. At the external peripheral portion of the motor frame 13, the air path 44 is open toward the load side of the motor 10 via an exhaust opening 45.

An intake hole 43 is formed in a central portion of an end wall 42a of the cover 42 facing the external fan 27b. This intake hole 43 is in communication with the air path 44 and faces a rotational central portion of the external fan 27b. At an outer side in a radial direction of the external fan 27b, a ventilation duct 6 is integrally formed with the cover 42, and the ventilation duct 6 extends to the outer side in the radial direction from the cover. A blow-out end 6a of the ventilation duct 6 is open toward a control device 5, and faces the control device 5 with a gap formed between the blow-out end 6a and the control device 5.

In the twelfth embodiment, a casing 35 of the control device 5 is arranged to cover only the side of the switching devices 31. Radiating fins 32 are exposed to the external air without being covered by the casing. The plurality of radiating fins 32 are arranged in a direction extending along a direction in which the vehicle runs. The blow-out end 6a of the ventilation duct 6 is not in the vertical direction but is in an inclined direction to face the radiating fins 32. The direction of the blow-out end of the ventilation duct 6 is not particularly limited. The direction can be freely set as long as the blow-out end 6a faces the radiating fins 32.

In the vehicle drive apparatus having the above structure, due to the drawing effect caused by the rotation of the external fan 27b, external air (cooling wind) blows into the air path 44 from the intake hole 43 of the cover 42 arranged in proximity to the side opposite to the load side of the rotational shaft 21, and the external air is separated into the ventilation duct 6 and the external periphery of the motor frame 13 by way of the external fan 27b. Subsequently, the cooling wind having blown into the ventilation duct 6 blows out of the blow-out end 6a of the ventilation duct 6, and bumps into the radiating fins 32. Thereafter, the cooling wind having bumped into the radiating fins 32 blows along the radiating fins 32, and is discharged to the outside. Therefore, the heat generated by the switching devices 31 and other devices of the control device 5 is radiated to the cooling wind via the attachment base 33 and the radiating fins 32. As a result, the control device 5 is cooled. Since the radiating fins 32 extend along the direction in which the vehicle 55 runs, the radiating fins 32 are also cooled by the natural wind received by the vehicle while the vehicle is running.

The cooling wind having passed through the air path 44 blows along the external surface of the motor frame 13, and is thereafter discharged to the outside through the exhaust opening 45. At this occasion, the cooling wind removes heat generated by a stator core 24 and a stator coil 25 and transmitted to the motor frame 13, thus cooling the motor 10.

According to the vehicle drive apparatus having the above structure, the control device 5 can be cooled by the cooling wind generated by the cooling fan 27b of the motor 10. At this occasion, the motor 10 and the control device 5 are completely separated. Therefore, the ventilation duct 6 is not worn out, and it is not necessary to detach the ventilation duct 6 during maintenance. Further, since the cooling wind bumps into the radiating fins 32, the heat transfer rate can be improved, and the cooling performance of the control device 5 can be improved. The vibration prevention effect and other effects similar to the first embodiment are also obtained in the twelfth embodiment.

The vehicle drive apparatus according to this invention is not limited to a railway vehicle, and can also be applied to other apparatuses such as automobiles, industrial machines, and the like. The vibration isolator is not limited to one type. A plurality of types of vibration isolating members having different vibration isolating properties may be used in combination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vehicle drive apparatus configured to drive a vehicle comprising a bogie with a wheel and a body supported on the bogie via a vibration damping mechanism, the vehicle drive apparatus comprising:
   a motor arranged on the bogie to drive the wheel;
   a cooling fan arranged to be rotatable integrally with a rotational shaft of the motor to cool the motor;
   a control device arranged under a floor of the body to face the motor with a space therebetween and configured to supply an electric power to the motor and control the motor; and
   a ventilation duct arranged between the motor and the control device and configured to guide a cooling wind blown by the cooling fan into the control device.

2. The vehicle drive apparatus according to claim 1, wherein the ventilation duct is flexible, and comprises one end connected to the motor and another end connected to the control device.

3. The vehicle drive apparatus according to claim 1, wherein the cooling fan is an internal fan arranged in the motor, and the fan is configured to draw the cooling wind into the motor via the control device and the ventilation duct, to pass the cooling wind through the motor and to discharge to an outside.

4. The vehicle drive apparatus according to claim 1, wherein the control device comprises an attachment base, a plurality of switching devices arranged on the attachment base, and a plurality of radiating fins arranged on a side of the attachment base that is opposite to the switching devices, and the ventilation duct is connected to guide the cooling wind to the radiating fins.

5. The vehicle drive apparatus according to claim 4, wherein the control device comprises a casing housing the attachment base, the switching devices, and the radiating fins, and
   an inside of the casing is divided by the attachment base into a first chamber for housing the switching devices and a second chamber for housing the radiating fins, and the casing comprises a first ventilation hole in communication with the second chamber and a second ventilation hole connecting the second chamber and the ventilation duct.

* * * * *